(12) United States Patent
Marley et al.

(10) Patent No.: US 12,687,186 B2
(45) Date of Patent: Jul. 21, 2026

(54) ADJUSTABLE HEIGHT FASTENER

(71) Applicant: B/E Aerospace, Inc., Winston Salem, NC (US)

(72) Inventors: Scott Marley, Edmands, WA (US); Glen Shaw, Colorado Springs, CO (US); Jakob J. Vetter, Snohomish, WA (US); Lance Allan McWilson, Falcon, CO (US)

(73) Assignee: B/E AEROSPACE INC., Winston Salem, NC (US)

( * ) Notice: Subject to any disclaimer, the term of this patent is extended or adjusted under 35 U.S.C. 154(b) by 752 days.

(21) Appl. No.: 18/074,307

(22) Filed: Dec. 2, 2022

(65) Prior Publication Data

US 2024/0183371 A1      Jun. 6, 2024

(51) Int. Cl.
*F16B 5/02*            (2006.01)
*B64D 11/02*           (2006.01)

(52) U.S. Cl.
CPC ............ *F16B 5/0225* (2013.01); *B64D 11/02* (2013.01)

(58) Field of Classification Search
CPC ....... F16B 5/0225; B64D 11/02; B64D 11/06; B64D 11/0696; B62D 33/08
See application file for complete search history.

(56) References Cited

U.S. PATENT DOCUMENTS

| | | | | | |
|---|---|---|---|---|---|
| 4,456,206 | A | * | 6/1984 | Tijssen | B64D 11/00 |
| | | | | | 410/127 |
| 5,511,760 | A | * | 4/1996 | Kambara | F16M 7/00 |
| | | | | | 248/188.4 |

| | | | | | |
|---|---|---|---|---|---|
| 7,374,131 | B2 | * | 5/2008 | Tiid | B64D 9/003 |
| | | | | | 411/398 |
| 8,152,117 | B2 | * | 4/2012 | Gain | F16B 5/0233 |
| | | | | | 248/188.4 |
| 8,382,415 | B1 | * | 2/2013 | Goldbaum | F16B 39/122 |
| | | | | | 411/383 |
| 9,862,166 | B2 | | 1/2018 | Lopez et al. | |
| 9,976,583 | B2 | * | 5/2018 | Lopez | F16B 5/01 |
| 10,696,403 | B2 | * | 6/2020 | Payne | F25D 17/045 |
| 11,850,810 | B2 | * | 12/2023 | Wirrick | B29C 70/685 |

(Continued)

FOREIGN PATENT DOCUMENTS

| | | | | | | |
|---|---|---|---|---|---|---|
| AT | 510323 | B1 | * | 9/2012 | | B62D 27/04 |
| DE | 102013105544 | A1 | * | 12/2014 | | E03F 5/0407 |
| EP | 2808457 | A2 | * | 12/2014 | | E03F 5/04 |

OTHER PUBLICATIONS

European Patent Office, European Office Action dated Apr. 16, 2025 in Application No. 23208619.9.

(Continued)

*Primary Examiner* — Benjamin P Lee

(74) *Attorney, Agent, or Firm* — SNELL & WILMER L.L.P.

(57) ABSTRACT

An adjustable height fastener may have a fixed load-bearing member connectable to a fixed structure and an adjustable load-bearing member connectable to the fixed load-bearing member at different locations along a first axis. An adjustment locking member is connectable to both the fixed load-bearing member and the adjustable load-bearing member to fix the fixed load-bearing member and the adjustable load-bearing member in a first location along the first axis.

11 Claims, 6 Drawing Sheets

(56)                    References Cited

U.S. PATENT DOCUMENTS

| 2005/0117966 A1* | 6/2005 | Steinbeck ............... | F16B 5/025 |
| | | | 403/408.1 |
| 2008/0056809 A1* | 3/2008 | Kielczewski ......... | F16B 5/0233 |
| | | | 403/118 |
| 2013/0017014 A1* | 1/2013 | Wandelt ................ | F16B 37/085 |
| | | | 403/343 |
| 2014/0064827 A1* | 3/2014 | Korenromp ............ | B64D 11/00 |
| | | | 403/63 |
| 2014/0352810 A1 | 12/2014 | Wedi | |
| 2017/0036750 A1* | 2/2017 | Lewis ...................... | H02G 3/22 |
| 2017/0253006 A1* | 9/2017 | Lopez ..................... | B32B 3/266 |
| 2017/0350437 A1* | 12/2017 | Benthien .............. | F16B 37/085 |
| 2018/0172043 A1 | 6/2018 | Brautigam | |
| 2024/0263665 A1* | 8/2024 | Marley ................. | B64D 11/02 |

OTHER PUBLICATIONS

European Patent Office, European Search Report dated May 8, 2024
in Application No. 23208619.9.

* cited by examiner

ADJUSTABLE HEIGHT FASTENER

FIELD

The present disclosure relates to fasteners, and more specifically, adjustable height fasteners.

BACKGROUND

Frequently two different articles are desired to be fastened together. However, in many situations, at least a portion of the joining process involves aligning aspects of fasteners in confined spaces or with limited visibility. For instance, aircraft lavatory units or aircraft seats may be removably attachable to mounting rails on an aircraft passenger cabin floor. As the unit or seat is moved into place adjacent to the mounting rail, the unit or seat occludes view and accessibility of the mounting rail and associated fasteners. This view occlusion also hampers adjustment of the fastener such as to raise, lower, or level the unit or seat.

SUMMARY

An adjustable height fastener is provided. The fastener may include a fixed load-bearing member connectable to a fixed structure. The fastener may include an adjustable load-bearing member connectable to the fixed load-bearing member at different locations along a first axis. The fastener may include an adjustment locking member connectable to both the fixed load-bearing member and the adjustable load-bearing member to fix the fixed load-bearing member and the adjustable load-bearing member in a first location along the first axis.

In various embodiments, one or more other feature is also provided. For instance, the fixed load-bearing member may be a lower collar and the adjustable load-bearing member may be an upper collar connectable to the lower collar at different locations along a first axis. The upper collar and the lower collar may be connectable by threading the upper collar over the lower collar, the upper collar and the lower collar having corresponding threads. The adjustment locking member may be a locking sleeve that is annularly shaped and disposable over at least a portion of both the fixed load-bearing member and the adjustable load-bearing member to connect to the fixed load-bearing member and the adjustable load-bearing member and to limit relative rotation of the fixed load-bearing member and the adjustable load-bearing member. The locking sleeve may have at least one key that extends into at least one corresponding keyway of the fixed load-bearing member and at least one corresponding keyway of the adjustable load-bearing member to limit relative movement of the fixed load-bearing member and the adjustable load-bearing member.

A bolt may attach a removable structure to the adjustable load-bearing member, the adjustable load-bearing member spacing the removable structure away from the fixed structure.

In various embodiments, an adjustable height fastener is contemplated. The fastener may include a lower collar connectable to a fixed structure and an upper collar that is threaded to attach to the lower collar and extend away from the lower collar a first distance in a first direction. The first distance is changeable by changing an amount of engagement of threads of the lower collar with threads of the upper collar so that the upper collar and the lower collar nest together attached by the threads. An annular sleeve is included and has an annulus and an engagement surface extending from the annulus. The annulus is received over at least a portion of at least one of the lower collar and the upper collar, and the engagement surface is received into at least one of a keyway of the upper collar and a keyway of the lower collar to fix the upper collar and the lower collar at the first distance.

One or more additional aspects may also be provided. For instance, the fixed structure may be a seat track of an aircraft cabin. A removable structure may be connected to at least one of the upper collar and the lower collar and may be spaced apart from the fixed structure by the combination of the lower collar and the upper collar, the spacing being changeable in response to the changing the amount of engagement of the threads of the lower collar with the threads of the upper collar. The removable structure may be an aircraft lavatory. The removable structure may be an aircraft passenger seat. A bolt may connect a bayonet plate to the upper collar, wherein the bolt is receivable into a bracket associated with a removable structure connectable to the fixed structure by the adjustable height fastener. The engagement surface may be a boss. The engagement surface may be a series of castellations. The annulus may be a washer, and the engagement surface may be an anti-rotation tab of the washer.

A removable aircraft lavatory system is provided. The removable aircraft lavatory system may include a modular aircraft lavatory configured for installation and removal from an aircraft passenger cabin having a plurality of floor-mounted seat rails. The removable aircraft lavatory system may have a plurality of adjustable height fasteners placed between the modular aircraft lavatory and the plurality of floor-mounted seat rails and configured to attach the modular aircraft lavatory to the plurality of floor-mounted seat rails. Each adjustable height fastener of the plurality of adjustable height fasteners may include various aspects. For instance, each fastener may include a fixed load-bearing member connectable to a floor-mounted seat rail of the plurality of floor-mounted seat rails. Each fastener may include an adjustable load-bearing member connectable to the fixed load-bearing member at different locations along a first axis extending away from a floor of the aircraft passenger cabin. An adjustment locking member may be connectable to both the fixed load-bearing member and the adjustable load-bearing member to fix the fixed load-bearing member and the adjustable load-bearing member in a first location along the first axis. The first location along the first axis is selected to space the modular aircraft lavatory away from the floor-mounted seat rail.

One or more further aspects may also be provided. For instance, the fixed load-bearing member may include a lower collar and the adjustable load-bearing member may include an upper collar connectable to the lower collar at different locations along a first axis. The upper collar and the lower collar may be connectable by threading the upper collar over the lower collar, the upper collar and the lower collar having corresponding threads.

In various embodiments, the adjustment locking member is a locking sleeve that is annularly shaped and disposable over at least a portion of both the fixed load-bearing member and the adjustable load-bearing member to connect to the fixed load-bearing member and the adjustable load-bearing member and to limit relative rotation of the fixed load-bearing member and the adjustable load-bearing member. The locking sleeve may have at least one key that extends into at least one corresponding keyway of the fixed load-bearing member and at least one corresponding keyway of the adjustable load-bearing member to limit relative movement of the fixed load-bearing member and the adjustable load-bearing member.

The forgoing features and elements may be combined in various combinations without exclusivity, unless expressly indicated herein otherwise. These features and elements as well as the operation of the disclosed embodiments will become more apparent considering the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein refers to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

Figure 1:
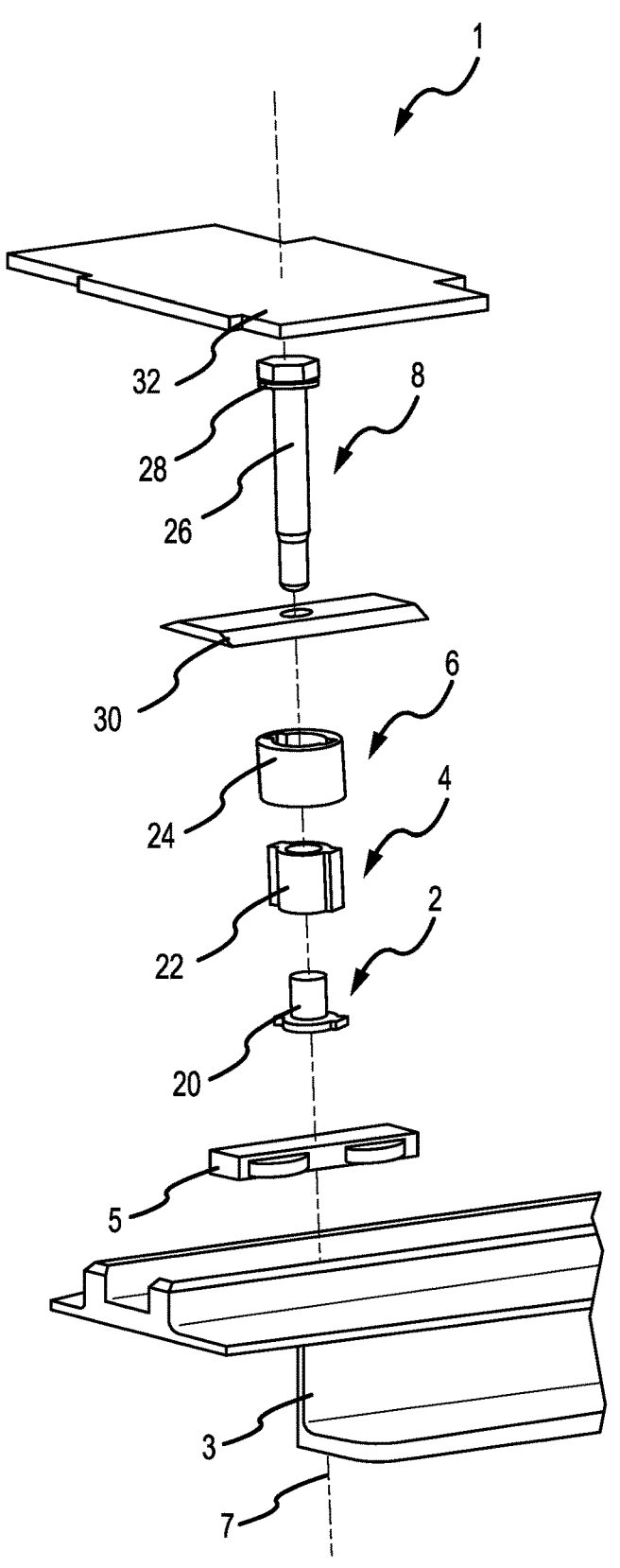
FIG. 1 illustrates an exploded view of an adjustable height fastener, in accordance with various embodiments.
Figure 2:
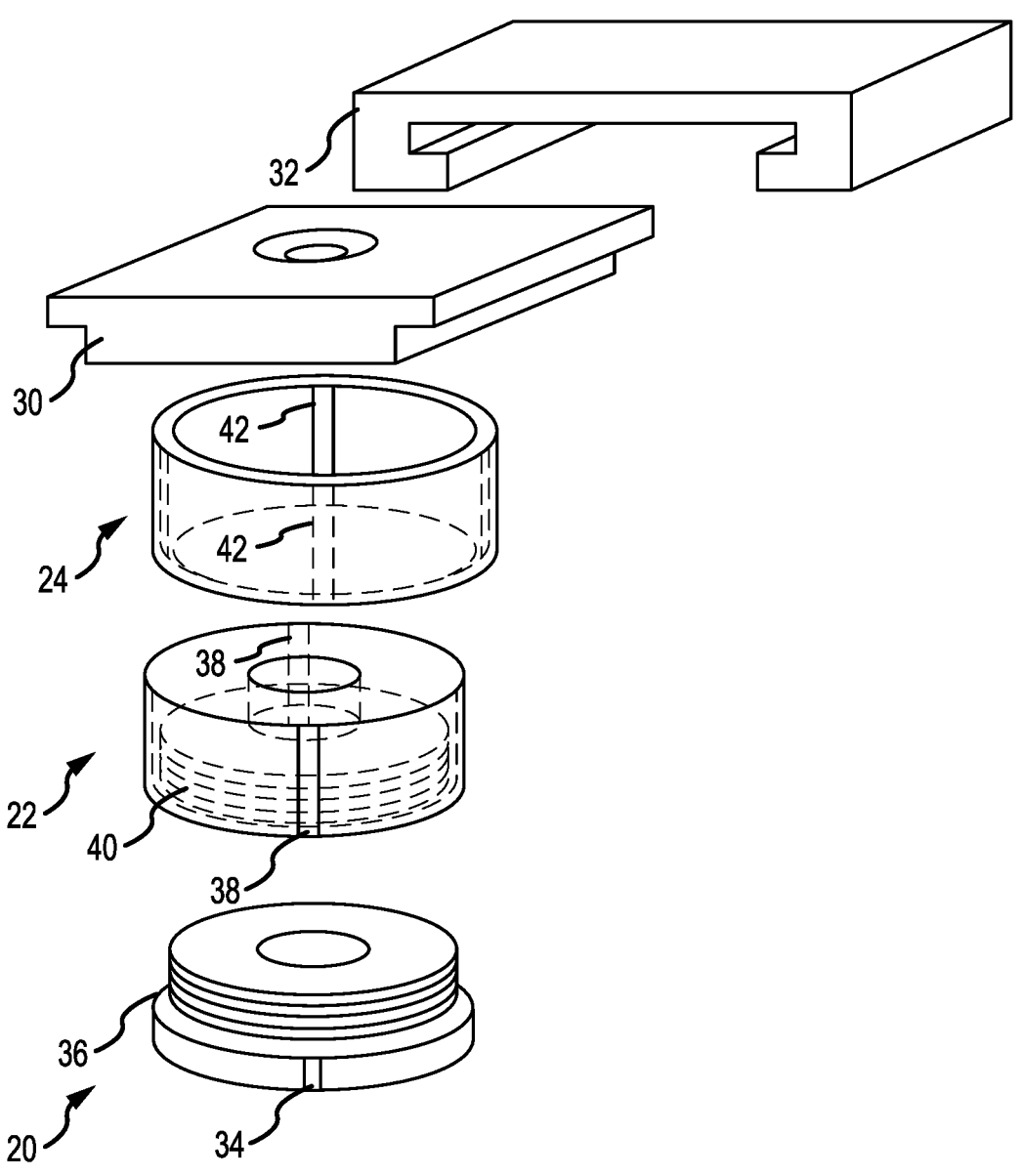
FIG. 2 illustrates a detailed view of an adjustable height fastener, in accordance with various embodiments.

With reference to FIGS. 1 and 2, an adjustable height fastener 1 is provided. An adjustable height fastener 1 may join two structures together. For instance, a removable structure such as a lavatory unit or aircraft passenger seat may be joined to a fixed structure such as an aircraft cabin floor. The fixed structure may, more specifically, be a seat track 3 having a seat track fitting 5 that receives the adjustable height fastener 1 in connection to the seat track fitting 5. In various instances, the fastener may be adjustable to change a spacing between the removable structure and the fixed structure. The fastener 1 may be adjustable to lengthen or shorten the fastener 1 along a first axis 7 to change a spacing between the removable structure and the fixed structure. The fastener may be adjusted, then fixed in position, prior to connection of the removable structure to the fixed structure via the fastener. In this manner, the removable structure may be installed in view-restricted or confined spaces with relative ease.

The adjustable height fastener 1 may include a fixed load-bearing member 2. The fixed load-bearing member 2 may be attached to the fixed structure such as the seat track fitting 5 of the seat track 3. The adjustable height fastener 1 may include an adjustable load-bearing member 4. The adjustable load-bearing member 4 may connect to the fixed load-bearing member 2. The connection of the adjustable load-bearing member 4 and the fixed load-bearing member 2 may be adjusted along a first axis 7. For instance, the adjustable load-bearing member 4 and the fixed load-bearing member 2 may be connected at different locations so that the adjustable load-bearing member 4 extends a greater or lesser distance along the first axis 7. In various instances, the adjustable load-bearing member 4 and the fixed load-bearing member both have threaded aspects that join together. By adjusting the amount of engagement of the threads of the adjustable load-bearing member 4 with the threads of the fixed load-bearing member 2, the members may be connected at different locations so that the adjustable load-bearing member 4 extends a greater or lesser distance along the first axis 7. An adjustment locking member 6 may be connectable to both the fixed load-bearing member 2 and the adjustable load-bearing member 4 to fix the fixed load-bearing member 2 and the adjustable load-bearing member 4 in a first location along the first axis 7. For example, the adjustment locking member 6 may limit further adjustment of the adjustable height fastener 1 so that the adjustable load-bearing member 4 extends a fixed distance along the first axis 7.

The fixed load-bearing member may comprise a lower collar 20. The lower collar may be a ring, a shaft, or other structure connectable to the adjustable load-bearing member 4. The adjustable load-bearing member 4 may comprise an upper collar 22. The upper collar 22 may be a ring, a shaft, or other structure connectable to the fixed load-bearing member 2. In various embodiments, the fixed load-bearing member 2 comprises the lower collar 20 and the adjustable load-bearing member 4 comprises the upper collar 22 connectable to the lower collar at different locations along a first axis 7. The upper collar 22 and the lower collar 20 may be connectable by threading the upper collar 22 over the lower collar 20, the upper collar 22 having threads 40 and the lower collar 20 having corresponding threads 36.

In various embodiments, the fixed load-bearing member 2 may be a lower collar 20 and the adjustable load-bearing member 4 may comprise an upper collar 22 connectable to the lower collar 20 at different locations along a first axis 7. The upper collar 22 and the lower collar 20 are connectable by threading the upper collar 22 over the lower collar 20, the upper collar 22 and the lower collar 20 having corresponding threads 36, 40.

In various embodiments, an adjustment locking member 6 is provided to fix the relative position of the fixed load-bearing member 2 and the adjustable load-bearing member 4 after adjustment. The adjustment locking member 6 may be a sleeve that goes over an outside of one or both of the upper collar 22 and the lower collar 20. For instance, the adjustment locking member 6 may be a locking sleeve 24 that is annularly shaped and disposable over at least a portion of both the fixed load-bearing member 2 and the adjustable load-bearing member 4 to connect to the fixed load-bearing member 2 and the adjustable load-bearing member 4 and to limit relative rotation of the fixed load-bearing member 2 and the adjustable load-bearing member 4. The locking sleeve 24 may have one or more keys 42 that insert into a corresponding keyway 38 of the upper collar 22 and/or a corresponding keyway 34 of the lower collar 20 to join the upper collar and the lower collar 20 and resist relative rotation of the upper collar 22 and/or the lower collar 20. By resisting relative rotation, further threading or unthreading of the union of the collars may be resisted and the adjustment may be fixed so that the adjustable load-bearing member 4 (and more specifically, the upper collar 22) is fixed to extend a fixed distance along the first axis 7. By providing multiple keys and/or multiple keyways, fine adjustments of the relative rotation of the upper collar 22 and lower collar 20 may be made, as multiple keys or multiple keyways permits rotation of the upper collar 22 or the lower collar 20 so that the different keys and different keyways align and interconnect.

In various embodiments, the adjustment locking member 6 comprises a locking sleeve 24 that is annularly shaped and disposable over at least a portion of both the fixed load-bearing member 2 and the adjustable load-bearing member 4 to connect to the fixed load-bearing member 2 and the adjustable load-bearing member 4 and to limit relative rotation of the fixed load-bearing member 2 and the adjustable load-bearing member 4. The locking sleeve 24 has at least one key 42 that extends into at least one corresponding keyway 34 of the lower collar 20 of the fixed load-bearing member 2 and at least one corresponding keyway 38 of the upper collar 22 of the adjustable load-bearing member 4 to limit relative movement of the fixed load-bearing member 2 and the adjustable load-bearing member 4.

The adjustable height fastener 1 may also include a securement member 8. The securement member 8 may prevent detachment of a removable structure joined to the adjustable height fastener 1, and correspondingly detachment of the removable structure from the fixed structure. The securement member 8 may include a bolt 26 and washer 28. The bolt 26 may insert through an opening of the upper collar 22 and the lower collar 20. A bayonet plate 30 and/or a bracket 32 may also be attached to the bolt 26. Thus, the adjustable height fastener 1 may further comprise a bolt 26 attaching a removable structure to the adjustable load-bearing member 2, the adjustable load-bearing member 2 spacing the removable structure away from the fixed structure.

Figure 3:
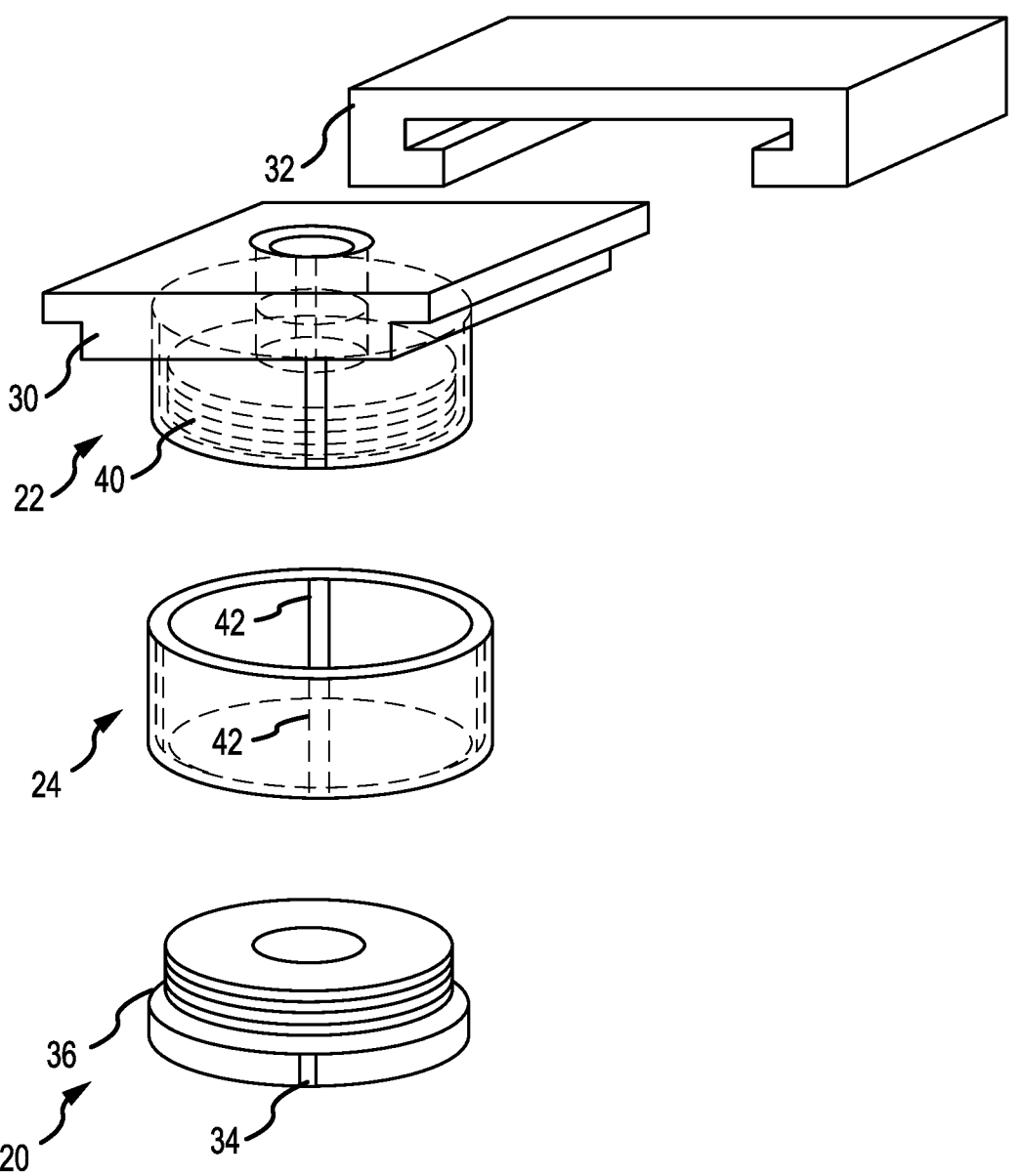
FIG. 3 illustrates a detailed view of an adjustable height fastener having a one-piece bayonet and upper collar, in accordance with various embodiments.

Directing attention to FIG. 3, like reference numerals are used to refer to like parts consistently with the discussion above. Notably however, the upper collar 22 and the bayonet plate 30 are a same piece of material such that the upper collar 22 and the bayonet plate 30 are monolithic with one another. The upper collar 22 and a lower collar 20 are provided with the upper collar 22 having a keyway 38 and threads 40 and the lower collar 20 having a keyway 34 and threads 36. A locking sleeve 24 is provided, having a key 42.

Figure 4:
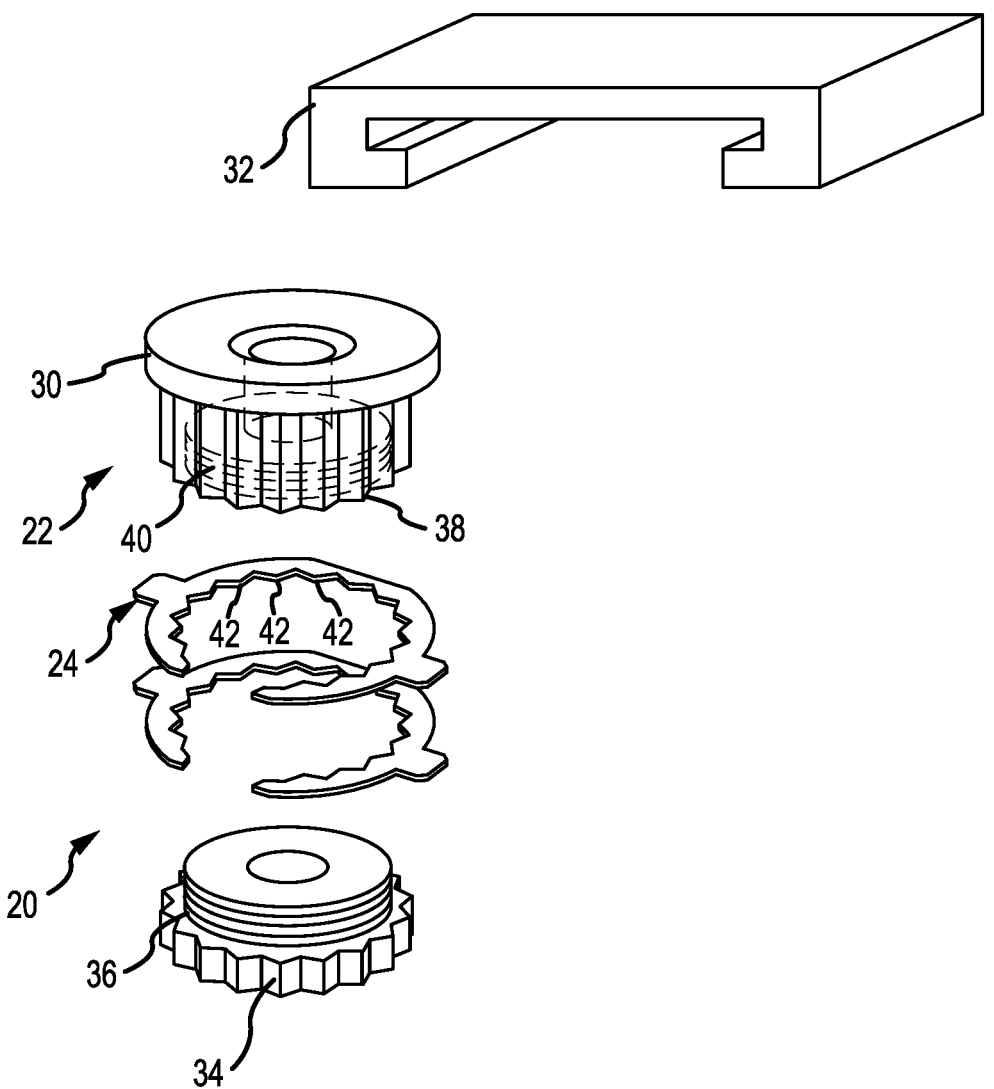
FIG. 4 illustrates a detailed view of an adjustable height fastener having a circular one-piece bayonet and upper collar, in accordance with various embodiments.

Directing attention to FIG. 4, like reference numerals are used to refer to like parts consistently with the discussion above. Notably however, the upper collar 22 and the bayonet plate 30 are a same piece of material such that the upper collar 22 and the bayonet plate 30 are monolithic with one another and are circular. The upper collar 22 and a lower collar 20 are provided, the upper collar 22 having one or more keyway 38 and threads 40 while the lower collar 20 has one or more keyway 34 and threads 36. A locking sleeve 24 is provided, having one or more key 42. Notably the one or more key 42 may be one or more ridges, serrations, flats, castellations, or the like and the keyway 34 may be shaped to correspond to the one or more key 42.

Figure 5:
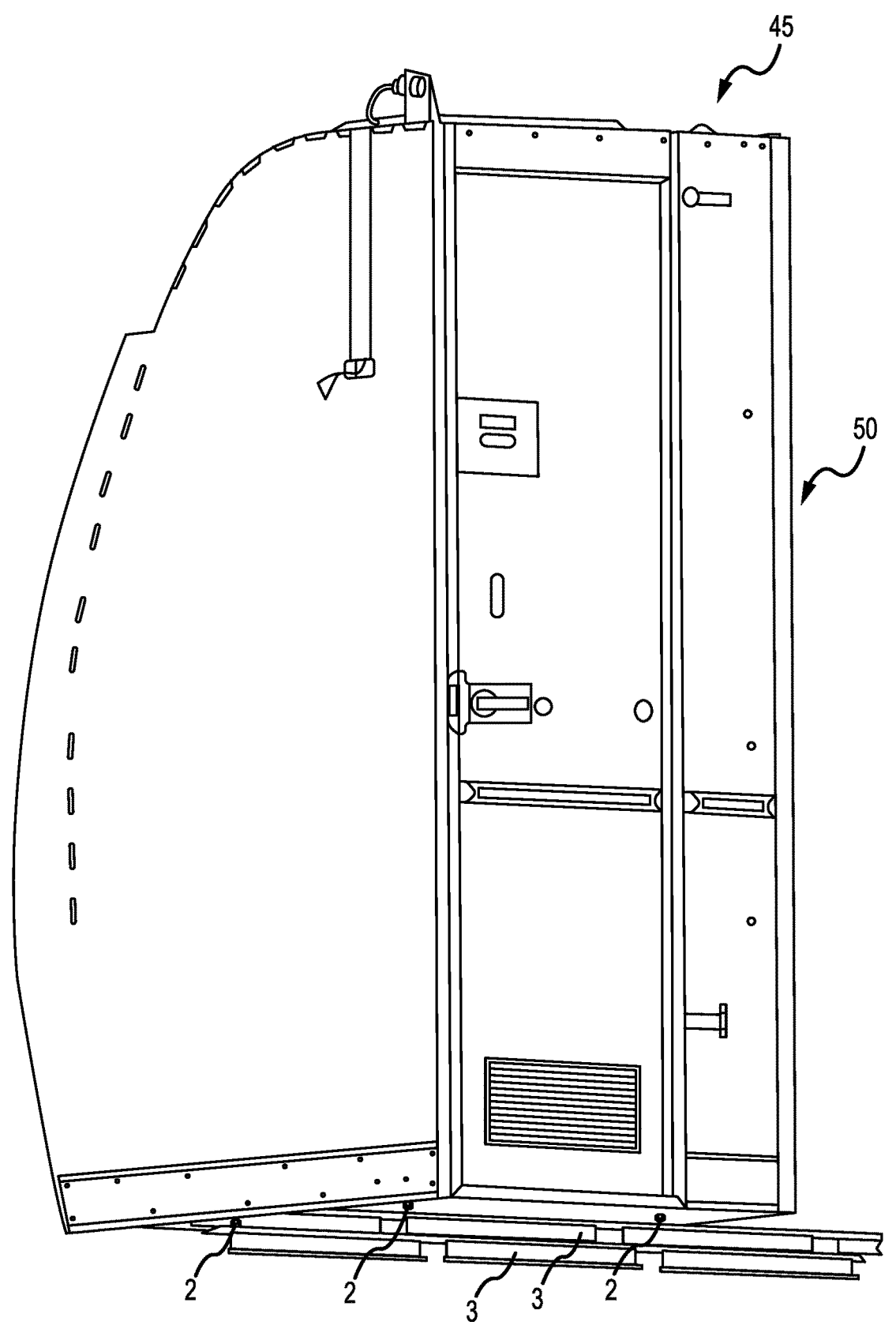
FIG. 5 illustrates an aircraft lavatory unit installed onto seat rails by adjustable height fasteners in accordance with various embodiments.
Figure 6:
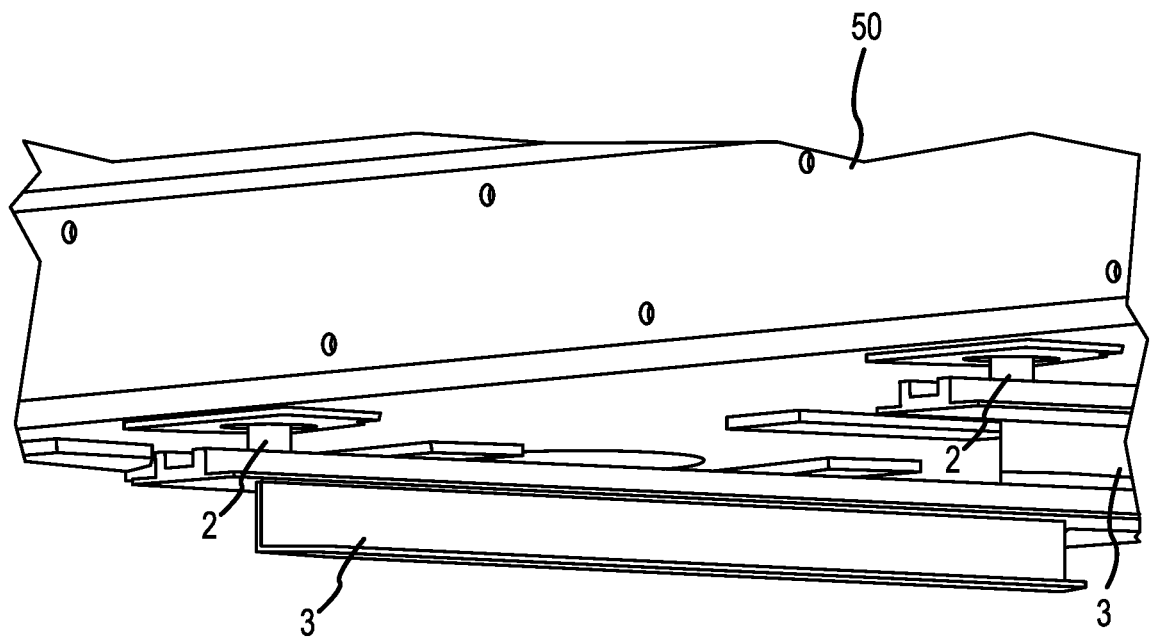
FIG. 6 illustrates a closeup view of the adjustable height fasteners of FIG. 5, in accordance with various embodiments.

With reference to FIG. 5, in various embodiments, a removable structure 50, such as an aircraft lavatory, or aircraft seat, may be mounted to a fixed element such as seat tracks 3 of the aircraft cabin floor. Multiple adjustable height fasteners 2 may be disposed between the seat tracks 3 and the removable structure 50 and connect the removable structure to the seat tracks 3. FIG. 6 illustrates a closeup view of the adjustable height fasteners 2 between the seat tracks 3 and the removable structure 50.

Referring to FIG. 1 and to FIGS. 5 and 6, in one example implementation, a removable aircraft lavatory system 45 includes a removable structure 50 such as a modular aircraft lavatory configured for installation and removal from an aircraft passenger cabin having a plurality of floor-mounted seat rails 3. A plurality of adjustable height fasteners 2 are placed between the modular aircraft lavatory (removable structure 50) and the plurality of floor-mounted seat rails 3 and configured to attach the modular aircraft lavatory (removable structure 50) to the plurality of floor-mounted seat rails 3. Each adjustable height fastener 1 of the plurality of adjustable height fasteners comprises a fixed load-bearing member 2 connectable to a floor-mounted seat rail 3 of the plurality of floor-mounted seat rails 3 and an adjustable load-bearing member 4 connectable to the fixed load-bearing member 2 at different locations along a first axis 7 (FIG. 1) extending away from a floor of the aircraft passenger cabin. An adjustment locking member 6 is connectable to both the fixed load-bearing member 2 and the adjustable load-bearing member 4 to fix the fixed load-bearing member 2 and the adjustable load-bearing member 4 in a first location along the first axis 7 (FIG. 1). The first location along the first axis 7 (FIG. 1) is selected to space the modular aircraft lavatory (removable structure 50) away from the floor-mounted seat rail 3.

With reference to FIGS. 1-6, other example configurations of the adjustable height fastener are provided. For instance, an adjustable height fastener 1 may have a lower collar connectable to a fixed structure. The adjustable height fastener 1 may have an upper collar 22 that is threaded to attach to the lower collar 20 and extend away from the lower collar 20 a first distance in a first direction 7. The first distance is changeable by changing an amount of engagement of threads 36 of the lower collar 30 with threads 40 of the upper collar 22 so that the upper collar 22 and the lower collar 20 nest together attached by the threads 36, 40.

The adjustable height fastener may have an annular sleeve (locking sleeve 24) comprising an annulus and a key 42 providing an engagement surface extending from the annulus. The engagement surface may be a boss. The engagement surface may be a series of castellations. In various embodiments, the annulus is a washer, and the engagement surface is an anti-rotation tab of the washer. The annulus may be received over at least a portion of at least one of the lower collar 20 and the upper collar 22. The engagement surface may be received into at least one of a keyway 38 of the upper collar 22 and a keyway 34 of the lower collar 20 to fix the upper collar 22 and the lower collar 20 at the first distance.

The aforementioned fixed structure may be a seat track 3 of an aircraft cabin. A removable structure 50 is connected to at least one of the upper collar 22 and the lower collar 20 and is spaced apart from the fixed structure by the combination of the lower collar 20 and the upper collar 22, the spacing being changeable in response to the changing the amount of engagement of the threads 36 of the lower collar 20 with the threads 40 of the upper collar 22.

The adjustable height fastener 1 may include other aspects as well. For instance, a bolt 26 may connect a bayonet plate 30 to the upper collar 22. The bolt 26 is receivable into a bracket 32 associated with a removable structure 50 connectable to the fixed structure by the adjustable height fastener 1.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment: for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An adjustable height fastener comprising:
   a fixed load-bearing member connectable to a fixed structure, wherein the fixed load-bearing member includes at least one first keyway on an outer circumference of the fixed load-bearing member;
   an adjustable load-bearing member connectable to the fixed load-bearing member at different locations along a first axis, wherein the adjustable load-bearing member includes at least one second keyway on an outer circumference of the adjustable load-bearing member; and an adjustment locking member connectable to both the fixed load-bearing member and the adjustable load-bearing member to fix the fixed load-bearing member and the adjustable load-bearing member in a first location along the first axis, wherein the adjustment locking member comprises a locking sleeve that is annularly shaped and disposable over at least a portion of both the fixed load-bearing member and the adjustable load-bearing member, wherein the adjustment locking member includes at least one key on an inner circumference of the adjustment locking member, and wherein the at least one key of the adjustment locking member is configured to slidably coupled to the at least one first keyway of the fixed load-bearing member and the at least one second keyway of the adjustable load-bearing member in order to limit relative rotation of the fixed load-bearing member and the adjustable load-bearing member.

2. The adjustable height fastener according to claim 1, wherein the fixed load-bearing member comprises a lower collar and the adjustable load-bearing member comprises an upper collar connectable to the lower collar at different locations along the first axis.

3. The adjustable height fastener according to claim 2, wherein the upper collar and the lower collar are connectable by threading the upper collar over the lower collar, the upper collar and the lower collar having corresponding threads.

4. The adjustable height fastener according to claim 1, further comprising a bolt attaching a removable structure to the adjustable load-bearing member, the adjustable load-bearing member spacing the removable structure away from the fixed structure.

5. The adjustable height fastener according to claim 2, wherein the fixed structure is a seat track of an aircraft cabin.

6. The adjustable height fastener according to claim 5, wherein a removable structure is connected to at least one of the upper collar and the lower collar and is spaced apart from the fixed structure by a combination of the lower collar and the upper collar, a spacing being changeable in response to the changing an amount of engagement of threads of the lower collar with threads of the upper collar.

7. The adjustable height fastener according to claim 6, wherein the removable structure is an aircraft lavatory.

8. The adjustable height fastener according to claim 6, wherein the removable structure is an aircraft passenger seat.

9. A removable aircraft lavatory system comprising: a modular aircraft lavatory configured for installation and removal from an aircraft passenger cabin having a plurality of floor-mounted seat rails; and a plurality of adjustable height fasteners placed between the modular aircraft lavatory and the plurality of floor-mounted seat rails and configured to attach the modular aircraft lavatory to the plurality of floor-mounted seat rails, wherein each adjustable height fastener of the plurality of adjustable height fasteners comprises: a fixed load-bearing member connectable to a floor-mounted seat rail of the plurality of floor-mounted seat rails, wherein the fixed load-bearing member includes at least one first keyway on an outer circumference of the fixed load-bearing member;

an adjustable load-bearing member connectable to the fixed load-bearing member at different locations along a first axis extending away from a floor of the aircraft passenger cabin, wherein the adjustable load-bearing member includes at least one second keyway on an outer circumference of the adjustable load-bearing member, and an adjustment locking member connectable to both the fixed load-bearing member and the adjustable load-bearing member to fix the fixed load-bearing member and the adjustable load-bearing member in a first location along the first axis, wherein the adjustment locking member comprises a locking sleeve that is annularly shaped and disposable over at least a portion of both the fixed load-bearing member and the adjustable load-bearing member, wherein the adjustment locking member includes at least one key on an inner circumference of the adjustment locking member, and wherein the at least one key of the adjustment locking member is configured to slidably couple to the at least one first keyway of the fixed load-bearing member and the at least one second keyway of the adjustable load-bearing member in order to limit relative rotation of the fixed load-bearing member and the adjustable load-bearing member, wherein the first location along the first axis is selected to space the modular aircraft lavatory away from the floor-mounted seat rail.

10. The removable aircraft lavatory system according to claim 9, wherein the fixed load-bearing member comprises a lower collar and the adjustable load-bearing member comprises an upper collar connectable to the lower collar at different locations along the first axis.

11. The removable aircraft lavatory system according to claim 10, wherein the upper collar and the lower collar are connectable by threading the upper collar over the lower collar, the upper collar and the lower collar having corresponding threads.

* * * * *